United States Patent
Donner et al.

(10) Patent No.: US 11,394,547 B2
(45) Date of Patent: Jul. 19, 2022

(54) TRANSACTION AGENTS AND SYSTEMS

(71) Applicants: Jack Donner, San Diego, CA (US);
Paul Atkinson, Poway, CA (US)

(72) Inventors: Jack Donner, San Diego, CA (US);
Paul Atkinson, Poway, CA (US)

(*) Notice: Subject to any disclaimer, the term of this patent is extended or adjusted under 35 U.S.C. 154(b) by 177 days.

(21) Appl. No.: 15/228,270

(22) Filed: Aug. 4, 2016

(65) Prior Publication Data
US 2017/0373849 A1 Dec. 28, 2017

Related U.S. Application Data
(60) Provisional application No. 62/358,685, filed on Jul. 6, 2016, provisional application No. 62/354,491, filed on Jun. 24, 2016.

(51) Int. Cl.
H04L 29/06 (2006.01)
H04L 9/30 (2006.01)
G06K 19/07 (2006.01)
G06K 19/077 (2006.01)
H04L 9/08 (2006.01)

(52) U.S. Cl.
CPC .......... H04L 9/30 (2013.01); G06K 19/0723 (2013.01); G06K 19/07758 (2013.01); H04L 9/0816 (2013.01)

(58) Field of Classification Search
CPC ................. H04L 9/30; H04L 9/0816
USPC ......................................... 713/171
See application file for complete search history.

(56) References Cited

U.S. PATENT DOCUMENTS

| 8,966,578 B1* | 2/2015 | Belov | G06F 9/45558 726/1 |
| 9,177,169 B2* | 11/2015 | Shablygin | G06F 21/6218 |
| 2003/0209601 A1* | 11/2003 | Chung | G06K 7/10336 235/385 |
| 2004/0093281 A1* | 5/2004 | Silverstein | G06Q 20/24 705/26.8 |
| 2004/0215550 A1* | 10/2004 | Preist | G06Q 30/08 705/37 |
| 2005/0277403 A1* | 12/2005 | Schmidt | G06F 21/10 455/410 |
| 2006/0049944 A1* | 3/2006 | Ishiguro | G06Q 10/087 340/572.1 |
| 2006/0080259 A1 | 4/2006 | Wajs | |

(Continued)

OTHER PUBLICATIONS

Reyna, "On blockchain and its integration with IoT. Challenges and opportunities", 2018, Elsevier, pp. 173-190 (Year: 2018).*
(Continued)

Primary Examiner — Taghi T Arani
Assistant Examiner — Gregory A Lane

(57) ABSTRACT

A hardware agent is a hardware device attached to, embedded in, or otherwise associated with a good. In particular, the hardware agent is bound to the good in such a way that information held by the agent may be confidently associated with the good. The hardware agent is constructed to securely hold information about the good, and information about stakeholders, such that the agent may autonomously make binding decisions regarding the good, including sales and financial transactions. Although the hardware agent may perform many functions autonomously, it often will have communication capabilities enabling it to share information with stakeholders, or to others as allowed.

39 Claims, 4 Drawing Sheets

Exemplary Hardware Agent

Figure, above, with optional clock/timer, sensors, display, verification circuitry and activation circuitry. Security circuitry (password circuitry and PKI circuitry etc.) not shown.

(56) References Cited

U.S. PATENT DOCUMENTS

| | | | |
|---|---|---|---|
| 2006/0124722 A1* | 6/2006 | Williams | G06Q 10/10 |
| | | | 235/375 |
| 2007/0033167 A1* | 2/2007 | Basu | G06F 17/30864 |
| 2008/0041947 A1* | 2/2008 | Hollister | G06Q 10/08 |
| | | | 235/385 |
| 2008/0104010 A1* | 5/2008 | Subramanian | G06K 7/0095 |
| 2008/0209506 A1 | 8/2008 | Ghai et al. | |
| 2008/0276086 A9 | 11/2008 | Proudler | |
| 2010/0259366 A1* | 10/2010 | Jiao | G06K 7/0008 |
| | | | 340/10.2 |
| 2013/0176115 A1* | 7/2013 | Puleston | H04L 67/04 |
| | | | 340/10.51 |
| 2014/0095450 A1 | 4/2014 | Marwah et al. | |
| 2015/0302349 A1* | 10/2015 | Atkinson | G06K 19/0717 |
| | | | 705/333 |
| 2017/0228730 A1* | 8/2017 | Ramirez | G06Q 20/40 |
| 2018/0091516 A1* | 3/2018 | Nixon | H04L 63/20 |

OTHER PUBLICATIONS

Search Report for PCT/US17/39033 issued by the International Searching Authority for the PCT dated Oct. 5, 2017.

* cited by examiner

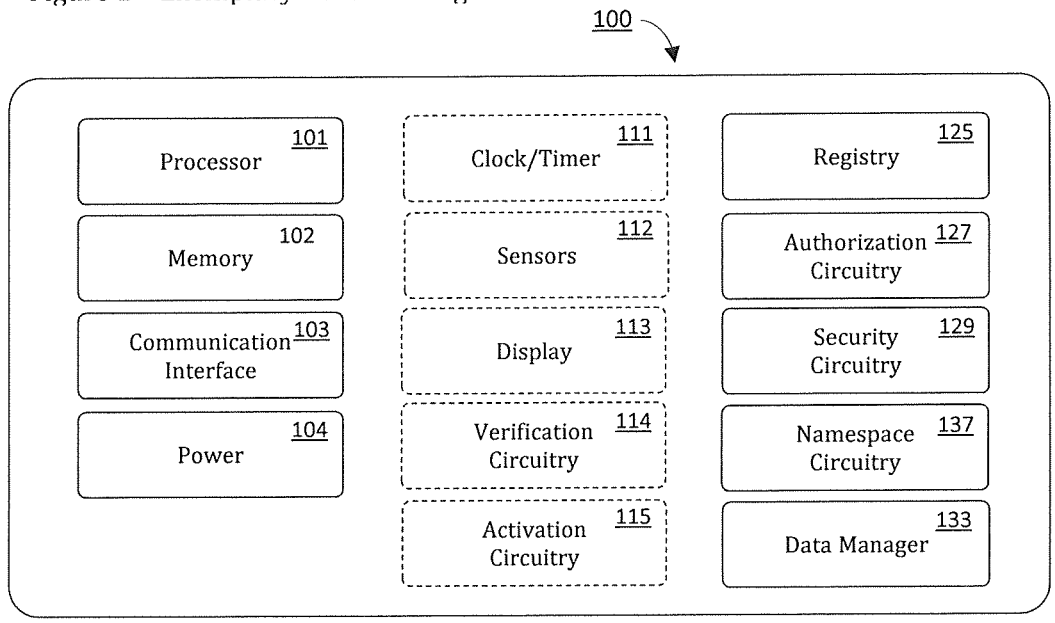
Figure 1, above, with optional clock/timer, sensors, display, verification circuitry and activation circuitry. Security circuitry (password circuitry and PKI circuitry etc.) not shown.
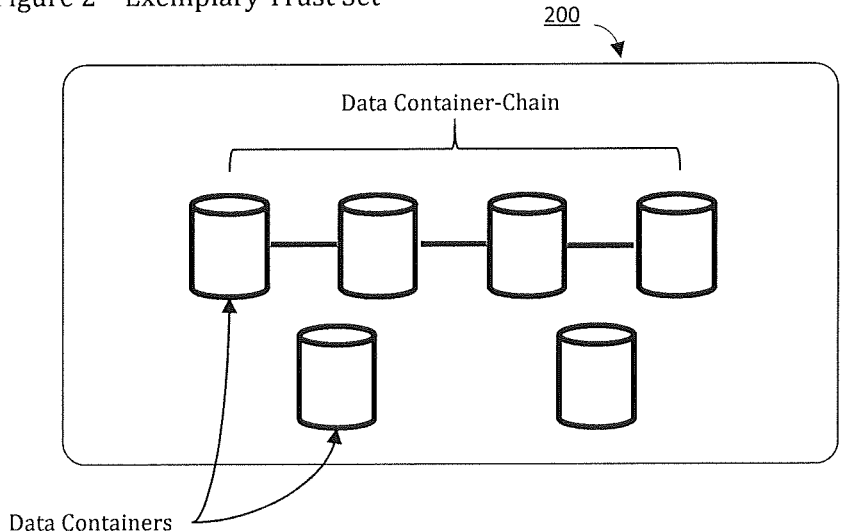

Figure 3 – Exemplary Trust Set for Chain-of-Custody Application
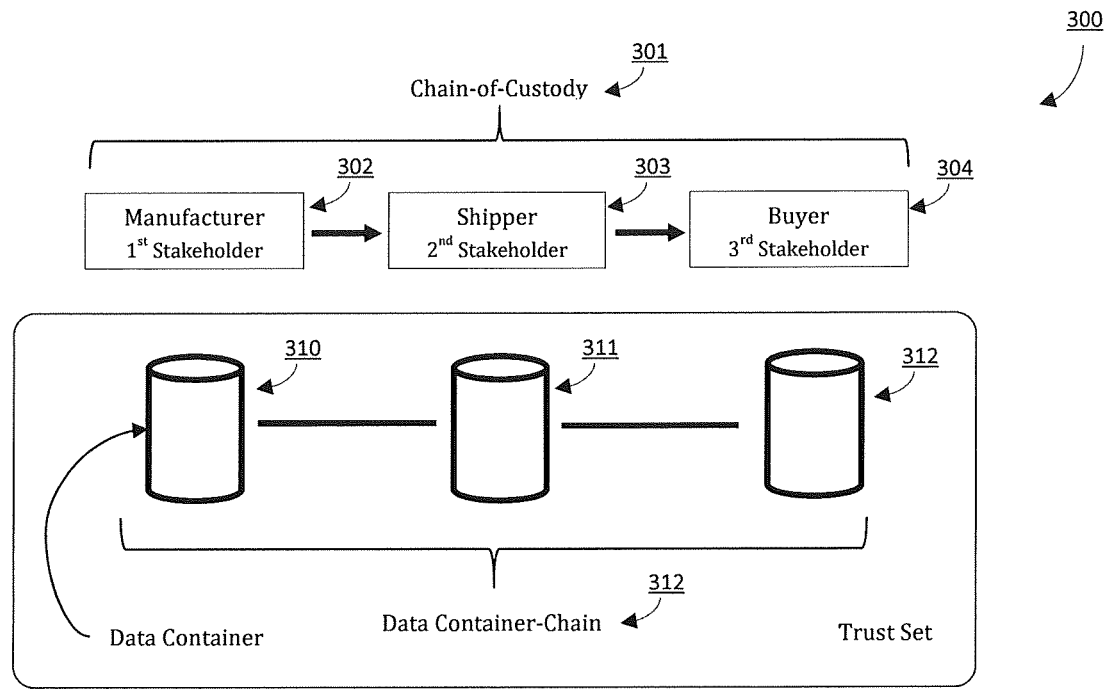
Figure 4 – Transaction System - Settlement
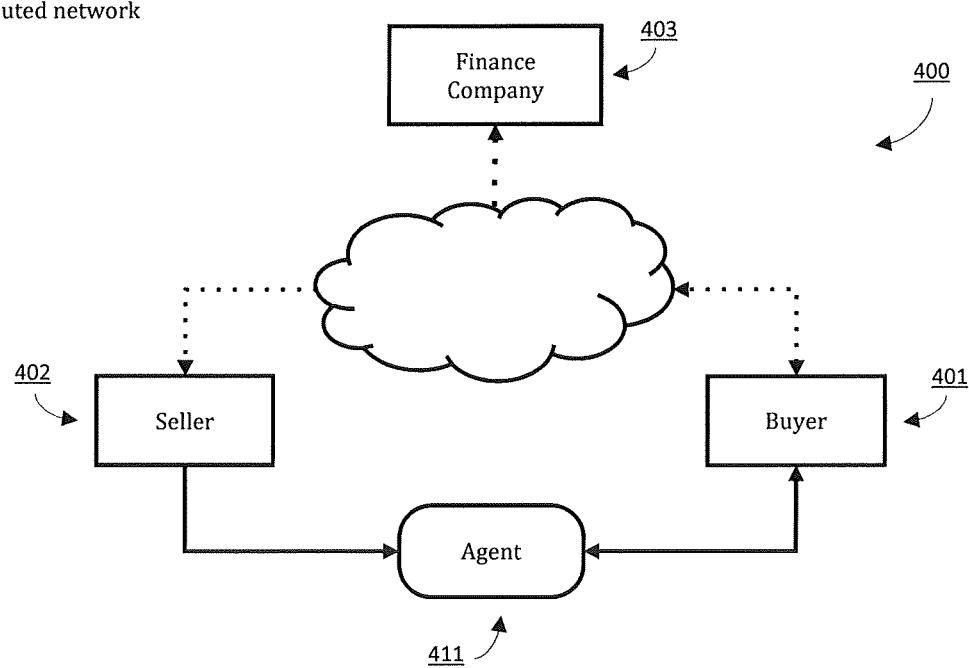

Figure 5 – Transaction System – Dynamic Pricing
Local communication ⟶
Published via ········▶
distributed network
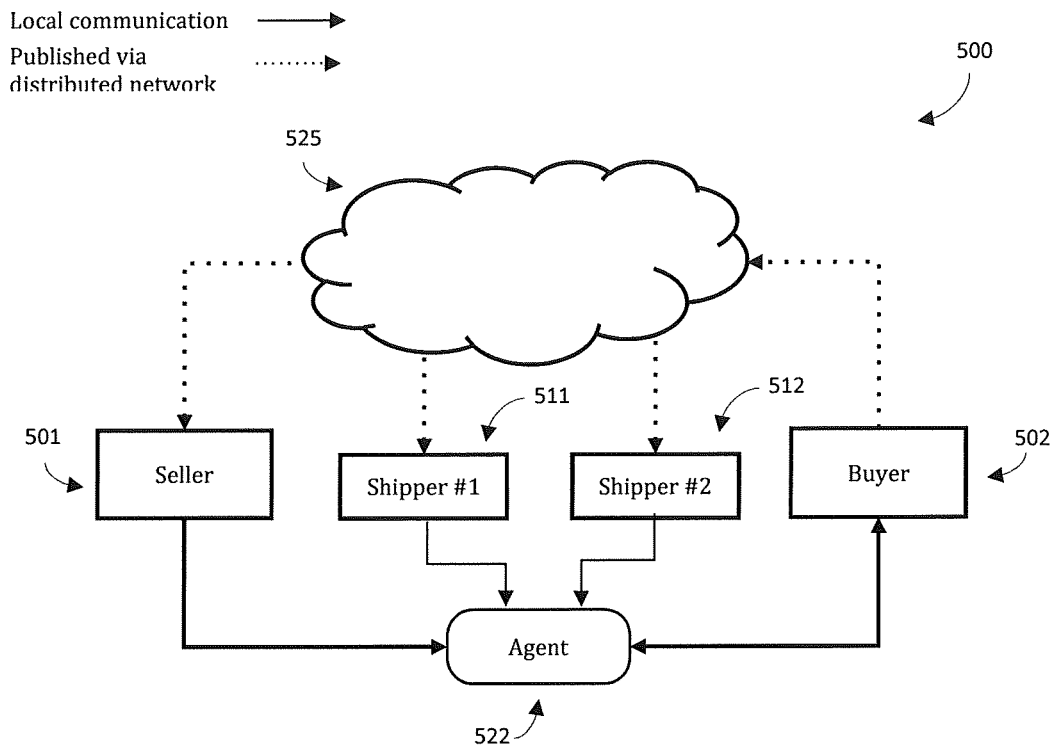
Figure 6 – Transaction System – Escrow
Local communication ⟶
Published via ········▶
distributed network
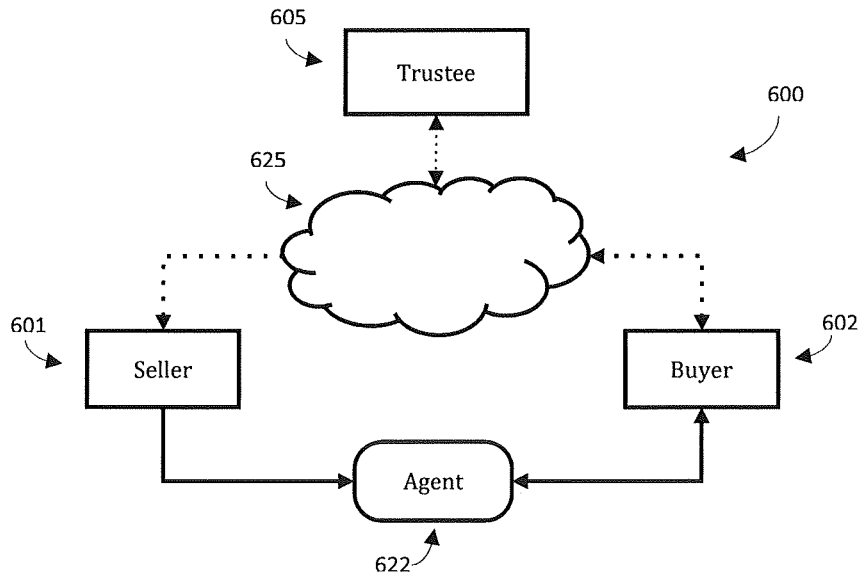

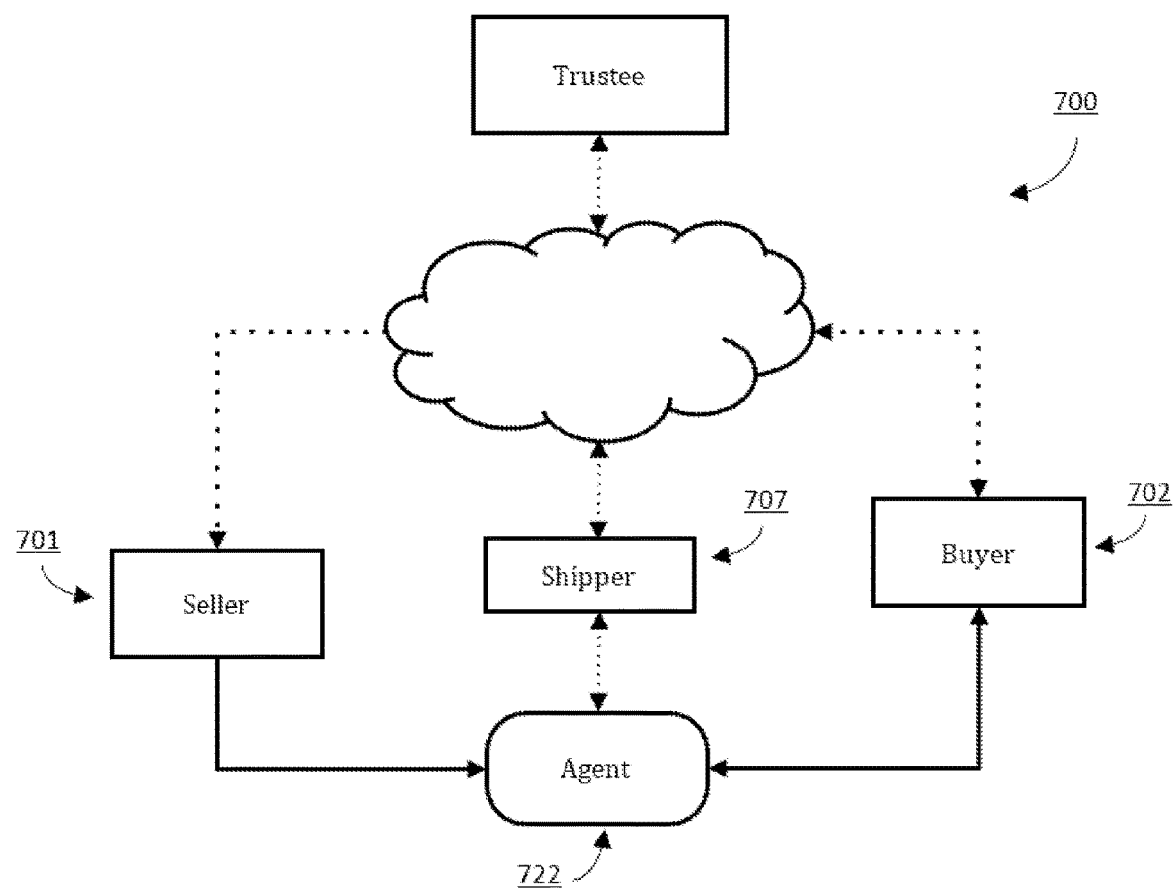

TRANSACTION AGENTS AND SYSTEMS

RELATED APPLICATIONS

This application claims priority to U.S. provisional patent application No. 62/354,491, filed Jun. 24, 2016 and entitled "CHR-038 Agents," and to U.S. provisional patent application No. 62/358,685, filed Jul. 6, 2016 and entitled "Agent Transaction Systems," both of which are incorporated herein in their entirety.

FIELD OF THE INVENTION

The present invention relates to an intelligent hardware agent that is particularly constructed to be associated with a good, and to enable trusted and verifiable transactions for that good. In one aspect, the hardware agent's electronics facilitates local decision-making to effect transaction decisions with limited or even no wide-area communication.

BACKGROUND

Modern commerce is increasingly dependent on transporting goods using carriers as society embraces more and more online shopping. For example, modern consumers are increasingly using online shopping and common carriers for delivering wine, prescription medication, food, and sensitive electronic devices. To assist in tracking and monitoring the movement of sensitive and expensive goods, labels have been developed in the past that incorporate RFID communication and intelligence. In this way, at the point of shipment and throughout the delivery flow, the good has the ability to be tracked. However, adoption of such RFID labels has been slow, as the equipment for initializing, loading, updating, and interrogating the label's RFID electronics is expensive, and typically only available at larger transfer points in the shipping transaction. Further, it is unlikely, and even rare, for the end consumer to be able to interact with the label. Since the consumer is a critical part of the delivery chain, and the consumer is excluded from participation in the information available on the label, the use of intelligent labels has been quite low and very ineffective in improving the customer experience.

Intelligent labels, packaging, tags, windshield stickers, stand-alone displays and other devices, collectively referred to herein as "intelligent labels," benefit from electro-optic devices that display messages that alert, update and inform the persons or machines proximate to them, as fully set forth in co-pending patent application Ser. No. 14/479,055, filed Sep. 5, 2014, and entitled "An Intelligent Label Device and Method," which is incorporated herein in its entirety. This earlier application describes an intelligent label that can be attached to any good, and then is used to provide a visual indicator to a human or machine on some condition or event in that distribution path. Of particular interest therefore are bistable and permanently irreversible electro-optic displays and intelligent labels that comprise them.

In one example of using the intelligent label, if a good is subjected to an extreme temperature or to vibration shock, then a visual indicator may be set such that a human or a machine will understand that the good is no longer of acceptable commercial quality. Of course, it will be appreciated that machines can perceive information outside of the normal human optical range. Messages for the intelligent label are visually perceptible forms of data, information, content, text, patterns, images, shapes, symbols, codes, and colors, for example. It is important to note that these are visual systems and the messages may change one or more times over the life of the intelligent label. Further the power source that drives them may be limited or intermittent or susceptible to accidental or intentional disruption. Other components of the intelligent label may also fail or be subject to tampering. In this way, the message that is intended by the local electronics to be displayed on the intelligent label may not actually be what the user or machine perceives. Accordingly, in some applications the utility and value of intelligent labels may depend on the confidence with which the messages can be relied upon to make decisions and take actions, and further, that the actual messages perceptible at the time those decisions were made or could or should have been made, and actions were taken or could or should have been taken can be reliably and securely verified.

Although the information provided by such an intelligent label is useful for facilitating transactions, completing transactions still relies on network or backend transactional systems and substantial post transaction involvement from the stakeholders. In almost every commercial transaction there are numerous stakeholders. A stakeholder is a person or entity that has at any point in a transaction an interest in that transaction's outcome. For example, a stakeholder may be the original manufacturer, a company that warehouses the good, one or more shipping companies, a bank that finances the transaction, and the end-user. Although an intelligent label may be able to facilitate the necessary information flow, it requires a substantial network transaction system to allow all of the stakeholders to participate. This need for a standard end-to-end and transaction support system creates barriers to the acceptance of such an intelligent label system.

Accordingly, there is a need to enable stakeholders in transactions involving a good to more easily and efficiently allow a good to enter the chain of commerce, ensure proper handling by all stakeholders, and effect final financial and title transfers. Importantly, these transactions need to be made in a secure, trustworthy, and verifiable environment for all parties involved.

SUMMARY OF THE INVENTION

An intelligent hardware agent ("hardware agent") is a hardware device attached to, embedded in, or otherwise associated with a good. In particular, the hardware agent is bound to the good in such a way that information held by the hardware agent may be confidently associated with the good. The hardware agent is constructed to securely hold information regarding the good, and information about stakeholders, such that the hardware agent may be authorized by stakeholders to autonomously make trusted decisions regarding the good, including for example pricing, sales, title and financial transactions. Although the hardware agent may perform many functions autonomously, it often will have communication capabilities enabling it to share information with stakeholders, or to others as allowed.

In one particular example, the hardware agent is a tag that is bound to a good, and the hardware agent has predefined stakeholders that are authorized to receive, ship, take title to that good, or make changes and decisions about the good's distribution. The hardware agent also includes predefined functions regarding the good. These functions, or primitives, provide rules and agreed upon conditions for managing the good through the distribution chain. These primitives are immutable, that is unchangeable, from the perspective of the stakeholders. In this way, the identity of the stakeholders is trustworthy and verifiable, and the actions that the hardware agent is able to take on their behalf are also trustworthy, verifiable, and unchangeable. In one construction the hardware agent has a registry that maintains a list of those entities authorized to share information with the hardware agent. If the identity of all the stakeholders are known at the time the hardware agent is populated, the registry may be constructed as a permanent read-only memory. In some cases, however, the registry may need at least a portion that can be securely updated at a later time by one of the authorized stakeholders to add, modify, or delete a stakeholder. Along with the immutable primitives described above the hardware agent also contains contracts or rules that set the actions stakeholders are allowed to take, and may monitor that the good is transported properly among various stakeholders. In some cases, the hardware agent may also interact with an escrow or trustee to facilitate conducting final transactions. The hardware agent's contract is hardware secured in such a way that it can only be modified or accessed by authorized stakeholders. The summation of contracts and immutable primitives represent the entire specification as documented in the legal agreement between the stakeholders. In one example, the contract can be set in a read only memory at the time the hardware agent is populated. For further security, a checksum or hashing algorithm may be used to assure that no intervening entity has modified the contract. It will be appreciated that other hardware and system-level processes exist for authenticating read-only memory content.

Advantageously, the hardware agent enables a new class of trusted and verifiable transactions, and provides a full and accurate record of the good's interactions throughout the distribution chain. In particular, such transactions may be effected with either no or only limited network processing or communication.

A hardware agent may be embedded in a tag, label, packaging or otherwise associated with a good to autonomously generate immediately actionable information, independently take actions and organically enable transactions. In this way, the hardware agent enables a new level of trust, accountability, manageability and verifiability to product transactions.

Many hardware agents will use increasingly sophisticated sensors to monitor their environments, manage or drive external devices (e.g. MEMS switches, sensors) and apply authentication or verification technologies. Most hardware agents will wirelessly communicate as well. However unlike known RFID tags and Bluetooth smart labels that are focused on collecting, storing and transmitting raw data for remote conversion into useful information, hardware agents will locally convert data directly into information that users (or other autonomous systems) can immediately act upon.

Hardware agents may also use visual displays—the universal human interface to information, and in many cases, the most efficient path to direct user or consumer actions. Display technologies set out in co-pending U.S. patent applications Ser. Nos. 14/927,098, 62/263,053 and 62/341,768 are incorporated herein in their entirety. By incorporating such display technology, hardware agents, and systems in which they operate, will be able to independently determine, interpret and verify visible information (messages) and in doing so bring further trust to end-to-end solutions with less reliance on network or backend transaction systems. Such visual indicators are a way to reduce barriers to adoption that the RFID tag communities have struggled to overcome. Hardware agents may also incorporate audible technology to receive and generate, and be able to independently determine, interpret and verify, audible information (messages).

Although hardware agents may be constructed to conduct transactions with no or limited network communications, hardware agents utilizing transactional technology may enable more sophisticated transactions unique to a hardware agent and good (e.g. dynamically adjust pricing in response to changes in the condition of a good, issue title, insurance, or payment in response to changes in custody etc.). Of particular interest are chain-of-custody applications, although it should be understood that the systems and methods described herein are applicable to other applications as well. An additional corollary to the above driver is that stakeholders won't have to trust other parties involved, including a centralized service or authority, as trust and verification are provided by the hardware agent itself.

In a typical chain-of-custody application, a hardware agent builds and stores a set of blocks or "data containers" of information that correspond to the 'custodies' of the hardware agent along the way. These data containers may include custodian information, monitored data, changes in condition or utility of the good, elapsed time, events and event times, authorizations, verifications and other information either generated, sensed, or received by the hardware agent. Together these data containers form an electronic "trust" that contains the information each stakeholder (e.g. custodian, owner, or financer) needs to conduct or participate in a transaction with regard to the good to which the hardware agent is associated or bound. Importantly, conducting the transaction may not require knowledge of the actual custodians or of the particular chain-of-custody. Nor does it always require real-time access to the cloud, industry-wide adoption or costly infrastructure. Instead, the trust set within the hardware agent itself, which is physically attached or associated with the good, provides sufficient verification and trust to effect the transaction.

In its simplest form, an agreement's business rules are developed and implemented separate from the contract and hardware agent's trust set. This approach allows for scalable ad-hoc as well as organic adoption and growth. The hardware agent may for example generate a trust set including adjusted prices in response to changes in monitored conditions and custodial participation, that are used by the stakeholders to update invoices and payment in an existing system.

Together, hardware agents and hardware agent-based transaction systems work together in a way that generates trust independent of the parties involved and thus enable a wide range of transaction types including, but not limited to:
  authorizing payment, purchases, title transfer;
  issuing credits, refunds, rebates, returns, replacements;
  customer relationship management, value-pricing, customer assurance;
  financing inventory, receivables; managing assets;
  underwriting insurance, processing claims; managing risk and liability;
  healthcare and government compliance;
  Chain-of-custody tracking, channel management, loss prevention; and
  retail performance, promotion monitoring, settlement, and consignment sales.

BRIEF DESCRIPTION OF THE DRAWINGS

FIG. 1 is a block diagram of a hardware agent in accordance with the present invention.

FIG. 2 is a block diagram of a trust data set in accordance with the present invention.

FIG. 3 is an illustration of a chain of custody using the hardware agent of the present invention.

FIG. 4 is a data diagram of a transactional system using a hardware agent according to the present invention.

FIG. 5 is a data diagram of a transactional system using a hardware agent according to the present invention.

FIG. 6 is a data diagram of a transactional system using a hardware agent according to the present invention.

FIG. 7 is a data diagram of a transactional system using a hardware agent according to the present invention.

DETAILED DESCRIPTION

Commercial transactions to sell a product, or good, usually involve multiple smaller transactions. For example, a manufacturer may make a good, and then use a shipper to stock the good in a distributor's warehouse. A customer may order the good, and then the distributor uses another shipper to get the good to the customer. For some commercial transactions, there may be a financing or insurance company that has a financial interest in the good or the overall transaction. Each party with an interest in the good or transaction, whom herein are referred to as stakeholders, each need to have confidence that the transaction is done according to agreed upon terms governing the transaction A hardware agent is constructed in ways to enable trusted, verifiable, and efficient transactions among multiple stakeholders, and to do so using simple local communication between the hardware agent and a particular stakeholder. Of course, additional functionality may be allowed as wide-area communication is used, but the core transaction does not require it.

In a transaction for most goods, there is an agreement between a buyer and a seller, and often several separate agreements between or among other stakeholders to the good. For the agreements that are known a priori, that is before the good first enters the field of commerce, those agreements can have the essential terms distilled into one or more electronic contracts that set each stakeholders rights and obligations. The contracts are then stored in the hardware agent, thus enabling the hardware agent to consummate a transaction with a stakeholder in compliance with an agreed-upon agreement.

In one implementation, the hardware agent has a set of permanent and unchangeable (immutable) functions that are common to all hardware agents within a class hardware agents. These functions, executed in silicon or firmware primitives, would include commonly used process assets, such as authentication, encryption, and password processing, and could be used by the electronic contract to efficiently and securely consummate a transaction. For further security and efficiency, some, if not all, of the electronic contract could be immutably set into the hardware agent.

To confirm that the contract set in the hardware agent is the one agreed to by the stakeholders, an appropriate certificate authority (e.g. generator of the contract, data warehouse, mutually agreed upon stakeholder etc.) generates and stores a checksum, hash or certificate for the contract. (1) When the contract is set in the hardware agent, the hardware agent generates an immutable checksum, hash or certificate for the contract using immutable certification circuitry (primitive) separate from the contract. The hardware agent then stores the checksum, hash or certificate in one or more of data containers. The hardware agent subsequently secures (encrypts) and communicates the data containers to stakeholders. (2) Upon receipt of their respective data containers, stakeholders compare their original checksum, hash or certificate against the one in the data container from the hardware agent.

Alternatively, the stakeholders may have mutually agreed upon contract and a checksum, hash or certificate generated using a mutually agreed upon algorithm. The hardware agent follows step 1 (above) and the stakeholder step 2 (above).

To certify the data containers in the hardware agent, the hardware agent can use immutable certification circuitry to generate a checksum, hash or certificate for each data container immediately prior to the data container being encrypted. The hardware agent then pairs each checksum, hash or certificate with the appropriate data container ID (optionally anonymous), stores the pairs in one or more data container (advantageously all of them), and them encrypts the data containers. The encrypted data containers are distributed to the stakeholders. The stakeholders decrypt their respective containers and compare the check-sum/hash codes to verify the integrity of the data containers. A data warehouse of other trustee would facilitate the comparison.

Hardware agents may be attached to, embedded in, or otherwise physically associated with items, goods or 'things', and can be thought of as acting on behalf of the stakeholders to effect transactions. Hardware agents are intelligent, communicable and in some cases may operate autonomously. Advantageously, hardware agents locally convert raw data or events into actionable information or transactions that may enable actions by users (e.g. via visual or audible output, or wireless signals) and transactions. Hardware agents are tangible (e.g. comprised of one or more ICs) and usually embedded within tags, labels, smart cards, packaging, or products, for example.

An exemplary hardware agent 100 is shown in FIG. 1. Hardware agents have a processor 101 and memory 102, and one or more communication interfaces 103, at least one of which is typically local area wireless (e.g. RF, optical or acoustic). In one example, the optical wireless interface may be provided as infrared communication link. Hardware agents also have an internal power source 104 (e.g. a battery or charged capacitor) or are externally coupled to a power source (e.g. harvested (RF, optical, radiated etc.).

Hardware agents may have clock/timers 111, sensors 112 and displays 113. Hardware agents may also have visual or audible verification (determination and interpretation) circuitry 114 (including related technologies) such as that described in U.S. patent application Ser. Nos. 14/927,098, 62/263,053 and 62/341768. Hardware agents may also have activation circuitry 115 such as electromechanical triggers to initiate or activate the hardware agent (or functions thereof) such as those described in U.S. patent application Ser. No. 14/479,055.

Hardware agents have a registry 125, which acts as the stakeholder's configuration. The registry 125 registers stakeholders and their IDs and other data associated with them. Of particular interest are:

public encryption keys associated with each stakeholder's ID and for which the stakeholder holds a corresponding private key;

stakeholder's rights to actionable information, access to memory (i.e. data containers) and control over functions;

rules governing security (e.g. encryption of data/information); and check-in protocols (e.g. password required, or not).

Check-in protocol refers to the act or fact of a stakeholder presenting itself, typically wirelessly, to a hardware agent in which it is already pre-registered. A custodial stakeholder for example, would check-in with a hardware agent when the hardware agent comes into its possession. Stakeholder authorization takes place when a previously registered stakeholder satisfies the criteria required for hardware agent authorization of that stakeholder.

Stakeholder registration takes place when a stakeholder, subject to the limitation defined for a stakeholder, provides the necessary details for a hardware agent to add the stakeholder to the registry. Stakeholder pre-registration may occur, for example, when an existing stakeholder (such as the shipper of a good), subject to the limitation defined for that stakeholder, provides the necessary details to a hardware agent to add another new stakeholder to the registry, or change the terms for the other stakeholder. Stakeholder pre-authorization may also occur when an existing stakeholder, subject to the limitation defined for a stakeholder, provides the necessary details to a new stakeholder to enable the new stakeholder to self-register to the registry. It will be appreciated that other processes for registering a new stakeholder may be used. Subject to the authorization circuitry 127, a stakeholder can register or (complete a pre-registration) and check-in for the first time (the 1st check-in) during the same communication with a hardware agent.

A hardware agent 100, advantageously in conjunction with the authorization circuitry 127 and security circuitry 129 may be configured to support dynamic discovery and check-in that allows the registry to be populated automatically based on external input (e.g. a type of wireless signal).

Hardware agents have authorization circuitry 127. An exemplary function of the authorization circuitry 127 is authorizing the registry to register stakeholders and their IDs, public keys, and rights, for example. Registration may be 'open' to anyone in possession of a hardware agent or subject to authorization by the authorization circuitry 127 based on information in the registry 125. In the latter case for example, a previously registered stakeholder with the appropriate rights (in accordance with the registry 125) could pre-authorize a new stakeholder.

A stakeholder may pre-authorize or pre-register a stakeholder. In either case full registration may depend on the stakeholder being authenticated or in custody of the hardware agent. If a seller (1st stakeholder) for example, knows the buyer of its product (2nd stakeholder), it may pre-register the buyer using the buyer's ID and public key in a hardware agent embedded in a label attached to the packaging. The hardware agent may further store a password encrypted with the buyer's public key. When the buyer takes possession of the product it uses its ID to wirelessly access the encrypted password, decrypt the password with its private key, and send the unencrypted password to the hardware agent. The hardware agent verifies the unencrypted password and completes the registration process (thus conferring rights to the buyer).

Hardware agents may have the characteristic of "sparse connections" whereby they are capable of performing most transaction functions with only local connections. A local communication is one that does not require any concurrent connection to any other stakeholder, or to any data asset that is remotely located, for example, in the cloud. For example, only a local communication between a stakeholder and a hardware agent is all that may be necessary to consummate a title or financial transaction. In this way, transactions may be finalized by the hardware agent in locations and by entities without the need to have the equipment and sophistication to communicate concurrently on wide area networks.

In a similar manner, registering a stakeholder with the hardware agent does not require a real-time connection to the cloud or a remote party. Note further that stakeholders may be registered without having possession of, or being communicatively coupled to a hardware agent. A pharmaceutical manufacturer for example may register the US government Food and Drug Administration (FDA) as a non-custodial stakeholder in a hardware agent for monitoring drugs used in clinical trials.

A stakeholder's ability to check-in may depend on the authorization circuitry 127, which in turn may depend on the registry 125.

The authorization circuitry 127 may also authorize stakeholders' (and in some cases even non-registered parties') to access information (e.g. data containers and corresponding trust information; actionable, authentication and certification information etc.).

The authorization circuitry 127 may also be used to access or publish information from a hardware agent. Authorization to access or publish information (or control functions within a hardware agent) may be limited to registered stakeholders (and their rights). A stakeholder in custody of a hardware agent for example, may need to be fully registered (have the necessary 'rights') before the authorization circuitry will allow the stakeholder to access and publish information. In other cases, some information may be authorized to be released or distributed to others that are not registered. For example, a hardware agent may have embedded information, such as product model number, that can be wirelessly extracted by anyone with an RFID scanning device. But, other, more sensitive information, such as wholesale price, would only be released to an authorized stakeholder.

Hardware agents have data management circuitry 133 (a "data manager") that organizes, secures and stores raw and processed data, and actionable and other information, into data blocks or data containers. Actionable and other information can be represented as a hierarchy of data within a hardware agent. A trust set represents the superset of information and data available to the agent. Each stakeholder's data and authorized information is represented by a namespace generated by namespace circuitry 137, which is a subset of the trust set that is available to a particular stakeholder.

Referring now to FIG. 2, an example trust set 200 is illustrated. In one example, a trust set comprises a set of data containers, which each container holding some information relevant to a good's transaction. A data container may hold data regarding the specific good, such as model number, serial number, and date of manufacture. Other data containers may hold data regarding the shippers that are expected to transport the good, and other data containers may contain information about limitations and thresholds for the environment the good is subjected to. Other data containers may have pricing arrangements, escrow instructions, or other processes to enable the hardware agent to autonomously effect a transaction. It will be appreciated that other data containers may be constructed to hold additional information. It will also be understood that each data container, or set of data containers, may have encryption, authorization, or other security certificates or processes embedded within. In the trust data set 200, there are data containers 201 that hold information about the good and authorized financial transactions. Each stakeholder has access to one or more data containers. Stakeholder's data containers are mapped to specific namespace, which logically associates instances of the data containers. Data containers may contain dynamically varying data (e.g. time based sensor samples) thus the importance that a namespace is associated with an instance of a data container. In one particular implementation, a hardware agent may define a data container as an object oriented construct. Then, each specific data container becomes an instance of that parent container in a hierarchical fashion. In this way, the provider of the hardware agent can set an overall construct for the data containers, and individual data containers may be created as needed to hold specific or more limited information. As will be appreciated, such a hierarchical object oriented system may use a namespace structure for conveniently identifying those data containers associated with a particular custodian, process, or location.

In a typical chain-of-custody application for example, data containers correspond to the individual custodies of an agent (e.g. the periods during which the manufacturer, shipper, retailer and consumer each have custody). Together the data containers form a trust set that corresponds to the entire chain-of-custody (from manufacturer to consumer). Referring to FIG. 3, and exemplary trust set 300 is illustrated. In trust data set 300, a chain of custody 301 extends from a first manufacturer 302, to a shipper 303, to the final buyer 304. The manufacturer 302, the shipper 303, and the final buyer 304 are all stakeholders in the associated good, and for purposes of this FIG. 3 are authorized and preregistered. When the manufacturer embeds the hardware agent into the good, or attaches a label to the good, a data container 310 is stored into the hardware agent, along with the information for the manufacturer 302. Further, the manufacturer will provide the hardware agent with data sufficient to authorize the shipper 303, and the buyer 304. The shipper 303 may then take custody of the good, and information regarding the shipper and the shipping process may be stored in one or more data containers 311. For example, data containers may hold information regarding the time of receipt, the length of time the shipper had the product, or other environmental data regarding the shipping process. When the buyer 304 receives the product, a final data container 312 is made showing the buyer stakeholder information as well as information regarding the timing of acceptance of the good. Accordingly, in this way and entire data container chain 321 memorializes the entire distribution process, and enables specific transactions throughout the distribution process.

A trust set (and data containers) may include verification and certification information, business rules and parameters to support and manage transactions, govern access to the container (information within) etc. To minimize memory and communication bandwidth, outcome enabling actionable information is often preferred over raw data. In many situations for example monitored temperature data is less desirable than the set of data corresponding to temperatures that exceeded a threshold, which in turn is less desirable than a simple 'out-of-spec' message.

Data containers and trust sets may be pre-specified or dynamically generated. For example, the data manager may use check-ins to define a container's namespace (e.g. the beginning and end of a custody or a period of time) and create a container accordingly. Check-ins also may be recorded or stored in, or be associated with, a trust set. Trust sets may also include information in the registry and elsewhere corresponding to stakeholders in the trust set in the registry. Trust sets may also include information about the hardware agent, its status, versions, time/date initialized, updated etc.

Dynamically generated data containers may also correspond to "events". For example, a data container's namespace might be defined by two temperature excursions (the "events"), and its contents include all the temperature (and other environmental conditions) measured in between the events (the excursions).

Data containers and trust sets may be "public" or otherwise represent different classes of stakeholders (particularly those without unique identities). A way of creating them is simply to register public stakeholders or similarly class-based stakeholders with the appropriate rights in the registry.

Individual data containers may comprise a chain (a "data container-chain"). An exemplary data container-chain is a sequential series of data containers that correspond to entire sequential series of custodies that comprise a hardware agent's chain-of-custody. Data containers in a data container-chain may include, separately or in groups, information in support of contracts or crypto currency, or transactions thereof.

Data containers within a trust set may be independent of a container-chain and a trust set may contain combinations of both. A container's namespace may be defined by the content contained within it. Two or more data container's may share the same namespace, but contain different information. A data container may span the namespace of more than one data container. The rights of a stakeholder may define a data container's namespace and/or its contents. Importantly, a single data container may be replicated and each otherwise identical copy separately encrypted using the respective public keys of different stakeholders. A data container's namespace and the information it contains may be defined by its relationships with other data containers.

Stakeholders may have access to one or more data containers depending on the registry. Multiple stakeholders may have access to the same data container, data containers or trust set.

Data containers (and the corresponding trust set) may be secured (e.g. encrypted) according to the registered rights (policies) of stakeholders. These rights determine the data containers, if any, to be encrypted and the public keys with which to encrypt them (and thus the stakeholders than can decrypt them). This allows data containers and trust sets to be distributed without limitation, but limits the parties (stakeholders) that can access their contents.

The data manager organizes, secures and stores information into data containers according to the rights of stakeholders and information to support transactions and the management thereof, further according varying levels of authorization.

"Stakeholder information" for example may be encrypted while an expiration date may be unencrypted. That would enable a data warehouse (below) to purge its databases of 'expired' containers without having to know anything else about them. Note that data containers and their corresponding trust set may be configured to, and include the information necessary to, operate as blocks (or nodes) in a classical crypto-currency blockchain, e.g. they may have a public key/private pair (PKI); one from the originating stakeholder and from the successor stakeholder.

The data manager in cooperation with the registry, authorization circuitry, and security circuitry and password manager and other hardware agent functions as appropriate, may advantageously enable anonymous access of data containers and trust sets using a system and method such as those described below.

To maximize privacy and minimize misuse of stakeholder specific transactions (e.g. a hacker could aggregate data containers having the same ID and identifying the stakeholder via public records) hardware agents can assign nondeterministic ID's to each container or trust. A system such as the one described below, by which stakeholders or the hardware agent can generate anonymous data container ID's may be desirable. For the exemplary embodiments that follow, a stakeholder has been pre-authorized and its Common ID and public key securely loaded into the registry of a hardware agent. The stakeholder's public key is part of a PKI key-pair, where the stakeholder holds the private key. The hardware agent also has a PKI pair (previously stored or dynamically generated).

In one embodiment, when the stakeholder takes custody of the good it wirelessly "checks-in" with the associated hardware agent and presents its Common ID. The hardware agent receives the Common ID and uses it to identify the stakeholder in its registry. The hardware agent generates a password and uses the stakeholder's public key (from the hardware agent's registry) to encrypt it. The hardware agent sends the encrypted password along with the hardware agent's public key to the stakeholder. The stakeholder (1) decrypts the encrypted password, (2) encrypts the password and separately, a Anonymous ID, using the hardware agent's public key, and (3) and sends both to the hardware agent. The hardware agent uses its public key to decrypt the password (thereby authenticating the stakeholder) and the Anonymous ID that it then loads into the registry and later uses to encrypt the stakeholder's container.

In an alterative embodiment, the hardware agent generates the Anonymous ID and securely communicates it to the stakeholder when the stakeholder registers or checks-in with the hardware agent. The hardware agent generates a password and Anonymous ID and encrypts both using the stakeholder's public key. The stakeholder uses its Common ID to access the encrypted password and Anonymous ID, and uses its private key to both. The stakeholder sends the decrypted password to the hardware agent. When the hardware agent receives the decrypted password the hardware agent assigns the Anonymous ID for future encryption of the stakeholder's data containers. It will be understood that there are other known public key—private key processes that could be implemented to generate an anonymous IDs (and other secure communications).

Nodes (hardware agents or data warehouses) can filter based on the Anonymous ID, which the stakeholder can use to anonymously access 'their' containers or trusts. The stakeholder can then use the appropriate private key to decrypt the data container or trust set. The data manager in cooperation with a hardware agent's other functions (and those of other systems in a transaction system—described below) may also support "forgetting".

Forgetting may be beneficial for many reasons including data obsolescence, a hardware agent being lost, damaged or otherwise no longer relevant or privacy rules that dictate the need to forget. Forgetting can be accomplished by making the transaction unreachable, destroying the key used to unlock the data or adding the transaction to a 'black list' etc. Forgetting actions may be in response to contracts (described herein) in support of agreements between stakeholders. Forgetting may be particularly useful where transaction storage is immutable (e.g. a blockchain) and in transactions involving escrow or other contingencies (e.g. the ability to cancel or reverse previously executed transactions).

The security circuitry includes encryption circuitry used for example to encrypt data containers and trust sets using appropriate stakeholder's public keys. When encrypted using a stakeholder's public key, only that stakeholder will have the corresponding private key that can decrypt the data container, trust set etc. In a preferred embodiment, stakeholders provide their own public keys (and maintain their own private keys). They may be provided via a public registry where they are available for stakeholders to pre-authorize or pre-register other stakeholders, or register themselves. This approach reduces the administration and risk of generating, distributing and managing keys, and importantly avoids a system dependency.

As part of the security circuitry hardware agents may include a password circuitry. With password circuitry, a hardware agent can generate and administer passwords for use in authenticating pre-authorized or pre-registered stakeholders etc. Internally generated passwords can be encrypted with a stakeholder's public key and stored until the stakeholder communicates with the agent—thus avoids exposing the unencrypted password.

The security circuitry may also have PKI circuitry to administer and support PKI services (or other security systems and methods) including generating and storing public/private key pairs. The PKI circuitry advantageously used in collaboration with the registry, authorization circuitry, data manager, namespace circuitry etc. to secure data containers and trust sets, communications and transactions, etc.

Public publication of stakeholder's IDs and associated public keys, simplifies authorization and registration. It also provides an efficient means to secure and identify data containers and trust sets specific to a particular stakeholder. That in turn allows nodes, e.g. both hardware agents and data warehouses (below), to efficiently organize and manage published data containers and trust sets.

As discussed previously, of particular interest to stakeholders is information that enables actions and transactions, otherwise referred to herein as actionable information. Actionable information, as the term is used herein however should also be understood to include all data and information advantageous to stakeholders (particularly in support of, participation in, transactions).

Stakeholders are parties with a direct or indirect stake in an agreement, contract, or hardware agent, or the actions, transactions or other outcomes thereof. Exemplary stakeholders include buyers, sellers, consumers, shippers or insurer, finance companies, service organizations, regulatory agencies, individuals (e.g. consumers and users) and other hardware agents etc.

Stakeholders have rights to actionable and other information that they typically exercise by being able to decrypt the data containers and/or trust sets that contain them. As previously described, stakeholders may also have rights to access a hardware agent's memory (read/write) or control its functions. Stakeholders may be custodial or non-custodial. A custodial stakeholder is one that takes custody of a hardware agent (e.g. by checking-in).

In some embodiments, a stakeholder may be one of a class of stakeholders and as such may not be independently registered with a hardware agent. In such circumstances, the actionable information in the form of data containers or a trust set associated with this class of stakeholders (e.g. via a shared ID, would typically be unencrypted).

Each stakeholder needs secure and reliable access to actionable information from the hardware agents in which it has a stake. Of particular interest therefore are decentralized network architectures that distribute the computing elements and data among autonomous nodes. Each node in the network holds equivalent authority to the whole and corruption of any node will not impact the operation of the system. In contrast, a centralized network architecture, often referred to as client server, exhibits a single point of failure in the server component.

A preferred decentralized network would exhibit the following characteristics:
- ability to discover and add additional nodes dynamically;
- peer to peer (node to node) communication;
- distributed application;
- database is distributed for security and reliability; and
- data and application information is based on a trustless network (i.e. the system provides the security there is no need to trust any "single authority.")

Publish as the term is used herein, is a shorthand way of expressing the distribution of actionable and other information (data containers and trusts), particularly in the context of a distributed architecture. According to the authorization circuitry a stakeholder or otherwise authorized party (or any party) in possession of the hardware agent could access and publish data containers and trust sets (e.g. an on-line retailer via an internet connected RFID reader, or its customer with an app on an NFC enabled smart phone). Because they are encrypted only the appropriate stakeholder can decrypt them and access their contents.

As a 'node' a buyer could use an Internet connected RFID reader, and/or later an end-user (e.g. consumer) could use an app on their RFID or Bluetooth enabled smart phone, to access and publish a data container from a hardware agent that would be distributed to all of the nodes in the network.

A data warehouse provides a decentralized mechanism for the storage and retrieval of published data containers. Data warehouses are nodes in a decentralized network that offer services such as publish, push/forward and supply on-demand. All data served by the data warehouse is encrypted and can only be accessed by stakeholders with the appropriate level of authorization (e.g. public/private keys). Data warehouses serve as a reliable data source to stakeholders who may choose to be intermittently connected, thereby reducing network load and increasing data security.

Data warehouses offer system level security by offering services such as the following:
- comparing encrypted data between themselves to 'certify' the results; alternatively, stakeholders can compare info from one warehouse to another and self-certify; and
- individually or in groups, certifying actionable information was available (and when) to all parties, and enable escrowed transactions (using complementary business rules); it's up to each of the stakeholders to dispute or challenge a transaction or outcome by a specified time, and it can be certified that they had the information available to do so; and servicing title insurance.

A hardware agent transaction system may be used to effect transactions according to explicit and implicit agreements between stakeholders. Agreements are implemented in transaction systems through "contracts." Contracts set the rules by which a hardware agent's actions, and those of other systems within the transaction system (e.g. those of stakeholders), are formed into a transaction (or transactions). Contracts set the actions of hardware agents including for example, the generation of data containers. Data containers are collections of data (input and generated) or rules and other elements necessary to effect transactions in support of agreements. In some applications, a data container may contain a partially or wholly executed contract, or stakeholder-specific versions of the contract.

In general, contracts determine many of a hardware agent's actions that involve the registry, authorization circuitry, data manager, security circuitry, namespace circuitry and other functions such as visual or audible verification (determination and interpretation), as necessary to implement the agreement. As described elsewhere herein, the stakeholders to the agreement can register and check-in with the hardware agent following a number of different methods in accordance with the contract (e.g. self-registered, pre-registered, pre-authorized etc.).

Example Transaction System—Settlement

FIG. 4 depicts a transaction system 400 to effect a simplified agreement between buyer 401, seller 402 and a finance company 403 (stakeholders) involving a good in which the finance company 403 has a security interest and to which the seller 402 has a financial obligation. As part of the agreement (separate from the contract) the seller 402 will bind an hardware agent 411 to the good prior to shipment, and upon delivery of the good to the buyer 401 effecting a change in custody, the buyer 401 will publish data containers from the hardware agent 411 via a distributed network to the stakeholders.

In this example, a contract could implement the agreement by setting the hardware agent so that the following actions take place once the buyer 401 takes custody of the good
- A. The buyer 401 remits funds (payment) to the finance company 403.
- B. The finance company 403 (1) Receives funds from the buyer 401; (2) releases its security interest in the good; and (3) remits funds to the seller 402 (the amount of the payment from the buyer 401 less its security interest).
- C. The seller 402 (1) receives funds from the finance company 403; (2) transfers title to the buyer 401.
- D. The buyer 401 receives title to the good.

In an alternate implementation, the hardware agent 411 could fully execute the contract on behalf of the stakeholders immediately upon the buyer 401 accepting custody of the good. The flow and post-agreement interactions between the stakeholders are thereby eliminated, and a more limited set of transactions take place:
- A. Title is transferred
- B. The security interest is cancelled
- C. Funds are transferred (seller 402 and finance company 403 each get their share)

With the contract in this later implementation, the hardware agent 411 forms the title, payment and other digital records and information when the buyer checks-in (takes custody of the good). As specified in the agreement and implemented with the contract, the funds may take the form of a crypto-currency or a variety of financial instruments that can be presented to conventional financial/banking systems.

In some implementations, a contract may be partially executed and subsequently published (e.g. as a data container for incorporation into a blockchain). And further, in some implementations, a contract, and by extension an agreement may be fully executed only after the actions of some or all of the stakeholders subsequent to the publishing of the data containers (e.g. all the stakeholders receiving data containers formed by the hardware agent advantageously including the contract or elements thereof).

Example Transaction System—Dynamic Pricing

In another example, a transaction system 500 (FIG. 5) effects a 1st agreement between a seller 501 and a buyer 502, and a 2nd agreement between a seller 501 and a 1st shipper 511 and a 2nd shipper 512.

With the 1st agreement, the seller 501 agrees to sell, and a buyer 502 agrees to buy from the seller 501, a good for a set price. The seller 501 and buyer 502 also agree that the price will be adjusted (e.g. discounted) in response to a monitored condition exceeding a set threshold (a threshold event) as determined by a hardware agent 522 attached to the good. The seller 501 agrees to bind the hardware agent 522 to the good and upon delivery of the good to the buyer 502 effecting a change in custody; the buyer 502 agrees to publish data containers from the hardware agent 522 (including those from the 2nd agreement below) via a distributed network 525 to the stakeholders.

Separately the seller 501 enters into agreements with a 1st shipper 511 and a 2nd shipper 512 where payment of the shippers' fees by the seller 501 is contingent upon: (1) the shipper checking-in with the hardware agent 522 when it takes possession of the good, and (2) the absence of a threshold event during the shipper's custody of the good.

In the implementation of the example agreements above, contracts specify the hardware agent's 522 actions on behalf of the stakeholders such as the following to take place once the buyer 502 takes custody of the good.

The buyer 502 (1) remits payment to the to the seller 501 based on the determined price and (2) receives title to the good.

The seller 501 (1) receives payment from the buyer 502 and (2) remits payment, if any, to the shippers 511/512.

The shippers 511/512 receive payment, if any.

A shipper 511/512 receives payment if it accepts custody of the good (checks-in with the hardware agent), takes care of the good while it is in its custody (the absence of a threshold event while the good is in their custody), and delivers the good to the successor custodian (the successor custodian checks-in).

In this example, the hardware agent would be configured with a power source (e.g. a battery) and a sensor or clock/timer for monitoring the specified condition (e.g. temperature, shock and vibration, or elapsed time). As the good moves through the supply chain, the bound hardware agent 522 would (1) monitor the condition of the good and (2) determine if a threshold event occurred during the custody of one of the custodians (e.g. one of the shippers). If so, the hardware agent 522 would further determine (1) the custodian that had custody when the threshold event occurred (by knowing the last custodian to check-in before the threshold event) and (2) the price to be paid by the buyer (by applying the set discount against the set price) and the corresponding remittance to the seller.

As in the previous example (and in the example that follows) the hardware agent's actions specified by the contracts involve functions such as the agent's registry, authentication circuitry, security circuitry, data manager, namespace circuitry etc. And the stakeholders to the agreement can be registered with the hardware agent 522 following a number of different protocols in accordance with the contract and described elsewhere herein (e.g. self-registered, pre-registered, pre-authorized etc.) And further, the contracts can be fully executed by the hardware agent and published by the buyer in accordance with the agreement.

Note that in accordance with an agreement and actions specified by contracts, the hardware agent 522 can form containers at different times (e.g. in response to events or stakeholders checking-in with the hardware agent etc.) and the containers can be published at different times by different stakeholders (e.g. the current custodian). In a variation on the above agreements and contracts, a shipper 511 for example could publish a data container after checking-in thus providing the seller 501 (and buyer 502) with updates on the good (e.g. custodian, conditions) and effect a transaction where the previous custodian receives payment immediately upon the conclusion of their performance under a contract. The transaction system could also effect transfer of title as the good passes through the chain-of-custody. In addition to effecting independent transactions, this implementation of a transaction system would lend itself to supporting blockchains.

Example Transaction System—Escrow

In another example, a transaction system 600 (FIG. 6) effects a simplified escrow agreement involving a seller 601, a buyer 602 and a trustee 605. The agreement stipulates that the seller 601 will sell to the buyer 602, and the buyer 602 will buy from the seller 601, a good for a set price. Further, prior to shipment of the good, the buyer 602 will place into escrow with the trustee 605 funds equal to the price of the good, and the seller 601 will place into escrow with the trustee 605, title to the good. As part of the agreement the seller 601 will register the buyer 602 and trustee 605 with a hardware agent 622, and bind the hardware agent 622 to the good prior to shipment. Further the seller 601 and buyer 602 will check-in with the hardware agent 622. The buyer 602 having checked-in with the hardware agent 622 (effecting a change in custody) will publish a data container from the hardware agent 622 via a decentralized network 625 to the stakeholders (including the trustee 605). Upon receipt of the data container from the hardware agent 622 (confirming buyer's 602 custody), the trustee 605 will transfer title to the buyer 602 and payment to the seller 601. In this example, a contract could implement the agreement by specifying the following actions take place by the hardware agent 622 and the trustee's 605 system:

The hardware agent 622 (1) registers the seller 601, buyer 602 and trustee 605; (2) accepts check-ins from seller 601 and buyer 602 and (3) forms a data container with the above information.

The trustee's 605 system (1) verifies the buyer 602 checked-in with the hardware agent 622; (2) transfer funds to the seller 601, transfer title to the buyer 602; and (3) publishes executed agreements to seller 601 and buyer 602.

Note that the transfer of funds and title can be executed digitally or by conventional means depending on the currency and terms agreed upon by the stakeholders.

A variety of security methods utilizing hardware agents 622 can be employed to authenticate transactions, the participants and elements thereof. A simple contract for example could specify actions so the trustee 605 can authenticate both the seller's 601 and the buyer's 602 participation in the transaction (the trustee 605 can determine that the data container it receives from the buyer 602 came from the hardware agent 622 that the seller 601 bound to the good). In addition to the above actions the contract could specify that the trustee's ID 605 and PKI public key are included when the trustee is registered by the seller 601. Accordingly, the hardware agent 622 encrypts the data container to be published by the buyer 602 using the trustee's 605 public key, and the decrypts the data container published by the buyer 602 using its private key (corresponding to its public key.)

The above transaction system could also effect an escrow agreement with pricing or other terms based on monitored conditions or changes in custody such as those previously described herein.

As depicted in FIG. 7, a transaction system 700 modifies the transaction system 600 to effect a variant of the basic escrow agreement where upon delivery of the good to the buyer 702, a shipper 707 publishes the data container formed by the hardware agent 722 after delivery to the buyer 702, or better, after the buyer 702 checks-in with the hardware agent 722 (accepts custody).

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. An autonomous hardware agent for a good or a transaction regarding the good, comprising:
   a processor;
   a memory;
   communication circuitry;
   a power source;
   an initial electronic registry of a plurality of stakeholders that each have an interest in the good or the transaction, the electronic registry storing each stakeholders' respective rights that the autonomous hardware agent will enforce according to an initial electronic contract agreed to between or among the stakeholders in the initial registry;
   the initial electronic contract comprising rules and conditions that determine an action of the autonomous hardware agent; and
   the initial electronic registry and the initial electronic contract are stored in the memory of the autonomous hardware agent and cannot be modified except wherein the processor implements the steps of:
   (a) receiving a request to (1) add to, (2) delete from or (3) modify the initial electronic registry or the initial electronic contract;
   (b) determining, using the initial electronic registry or the initial electronic contract, if the request is authorized;
   (c) if the request is determined in step (b) to be authorized; then performing the request.

2. The autonomous hardware agent of claim 1, wherein at least the rights for one stakeholder is immutably identified in the initial electronic registry.

3. The autonomous hardware agent of claim 1, wherein at least a portion of the initial electronic contract is immutably stored.

4. The autonomous hardware agent of claim 1, further comprising primitive functions immutably stored in the autonomous hardware agent that are used by the processor to take the action.

5. The autonomous hardware agent of claim 1 wherein the action is to form a secure data container, and the processor uses stakeholder information from the registry to assign an address or an ID to the data container according to the initial electronic contract.

6. The autonomous hardware agent of claim 5 wherein the assigned identity is anonymous.

7. The autonomous hardware agent of claim 1, wherein the action includes forming a secure data container.

8. The autonomous hardware agent of claim 7, wherein the data container is encrypted to a stakeholder other than the particular stakeholder.

9. The autonomous hardware agent of claim 7, where the action includes using the communication circuit for communicating the secure data container to one of the stakeholders.

10. The autonomous hardware agent of claim 7, where the action includes using the communication circuit for broadcasting the secure data container to a wide area network.

11. The autonomous hardware agent of claim 7, further comprising a visual display circuit for displaying information regarding the data container or its contents.

12. The autonomous hardware agent of claim 11, further comprising verification circuitry operably coupled to the visual display to verify the visual information is properly displayed.

13. The autonomous hardware agent of claim 7, further comprising an audio circuit for audibly presenting information regarding the data container.

14. The autonomous hardware agent of claim 13, further comprising verification circuitry operably coupled to the audible component to verify the audible information is properly broadcast.

15. The autonomous hardware agent of claim 1, further including security circuitry.

16. The autonomous hardware agent of claim 1, further including encryption circuitry.

17. The autonomous hardware agent of claim 1, further including an actuator device that activates the processor.

18. An autonomous hardware agent for a good or a transaction regarding the good, comprising:
    a processor;
    a memory;
    communication circuitry;
    a power source;
    an initial electronic registry of a plurality of stakeholders that each have an interest in the good or the transaction, the electronic registry storing each stakeholders' respective rights that the autonomous hardware agent will enforce according to an initial electronic contract agreed to between or among the stakeholders in the initial registry;
    the initial electronic contract comprising rules and conditions regarding the good or the transaction;
    the initial electronic registry and the initial electronic contract are stored in the memory of the autonomous hardware agent and cannot perform an action with regard to the good or the transaction, except wherein the processor implements the steps of:
    (a) receiving a request to perform the action with regard to the good or transaction;
    (b) determining, using the initial electronic registry and the initial electronic contract if the request is authorized or is not authorized;
    (c) if the request in step (b) is authorized, then performing the requested action; and
    (d) if the request in step (b) is not authorized, then denying the requested action.

19. The autonomous hardware agent of claim 18, wherein the performed action includes the processor using the initial electronic contract and the initial electronic registry to autonomously transform event data for stakeholders.

20. The autonomous hardware agent of claim 19, further comprising a sensor, and wherein the sensor generates the event data.

21. The autonomous hardware agent of claim 19, wherein the performed action includes the processor using the initial electronic contract and the initial electronic registry to store transformed event data into a data container for one or more stakeholders.

22. The autonomous hardware agent of claim 18, wherein the performed action includes the processor using the initial electronic contract and the initial electronic registry to secure the data containers for stakeholders.

23. The autonomous hardware agent of claim 18, wherein the performed action includes the processor using the initial electronic contract and the initial electronic registry to enable a transaction.

24. The autonomous hardware agent of claim 23, wherein information regarding the transaction is stored in a secure data container.

25. The autonomous hardware agent of claim 18, further comprising:
 a local communication circuit; and
 wherein the autonomous hardware agent communicates data containers on behalf of stakeholders in the registry.

26. The autonomous hardware agent of claim 18, further comprising certification circuitry; and
 wherein the processor uses the certification circuitry to generate a checksum, hash, or certificate that provides certification information for the initial electronic contract, and forming a data container with the certification information.

27. The autonomous hardware agent of claim 18, further comprising certification circuitry;
 wherein the processor uses the certification circuitry to generate a checksum, hash, or certificate that provides certification information for one or more data containers, and populating a data container with the certification information.

28. A method of using an autonomous hardware agent with a good or for a transaction regarding the good, comprising:
 providing the autonomous hardware agent with information in an initial electronic registry of a plurality of stakeholders that each have an interest in the good or the transaction, the electronic registry storing each stakeholders' respective rights that the autonomous hardware agent will enforce according to an initial electronic contract agreed to between or among the stakeholders in the initial registry;
 receiving a request to take an action with regard to the good or transaction;
 determining if the request is authorized or is not authorized according to the the initial electronic registry or the initial electronic contract;
 if the request is authorized, then performing the requested action and
 if the request is not authorized, then denying the requested action.
 wherein both the initial electronic registry and the initial electronic contract are stored in a memory of the autonomous hardware agent.

29. The method according to claim 28, further including:
 forming a first secure data container for at least one of the stakeholders that includes information regarding the good or transaction; and
 communicating the first data containers to at least one of the stakeholders using communication circuitry.

30. An autonomous hardware agent for a good or a transaction regarding the good, comprising:
 a processor;
 a memory;
 communication circuitry;
 a power source;
 an initial electronic contract stored in the memory that holds a plurality of rule sets, each rule set defining rules and conditions for one of plurality of stakeholders that have an interest in the good or the transaction;
 wherein the autonomous hardware agent implements the steps of:
 receiving a request to take an action with regard to the good or transaction;
 determining if the request is authorized according to each stakeholders respective rule set in the initial electronic contract;
 if the request is determined to be authorized and can be performed in compliance with all the stakeholders' rule sets, then performing the requested action; and
 if the request is determined not to be authorized, then denying the requested action.

31. The autonomous hardware agent according to claim 30, wherein the autonomous hardware agent is attached to or integrated with the good.

32. The autonomous hardware agent according to claim 30, wherein the determining step includes using (1) a registry, (2) authorization circuitry, (3) a data manager, (4) security circuitry, (5) namespace circuitry, or (6) verification circuitry.

33. The method according to claim 29, where the determining steps include the step of addressing each data container anonymously.

34. The method according to claim 29, where the forming steps include the step of using public key/private key encryption.

35. The method according to claim 29, where the communicating step includes the step of directly communicating a data container to a stakeholder using a local communication link between the autonomous hardware agent and the stakeholder.

36. The method according to claim 29, where the communicating step includes the step of broadcasting a plurality of data containers on a wide area network.

37. The method according to claim 36, further including the step of a receiving stakeholder identifying data containers that are encrypted to the receiving stakeholder.

38. The method according to claim 36, further including the step of at least one of the stakeholders receiving an anonymous address from the autonomous hardware agent, and using the anonymous address to identify those data containers that are encrypted to the stakeholder.

39. The autonomous hardware agent of claim 7, wherein the data container is encrypted to a particular one of the stakeholders in the initial electronic registry.

* * * * *